United States Patent [19]
Komatsu et al.

[11] Patent Number: 5,087,074
[45] Date of Patent: Feb. 11, 1992

[54] VEHICLE SUSPENSION MOUNTING STRUCTURE

[75] Inventors: Nobuhiro Komatsu, Yokohama; Mitsuru Fujinaka, Higashihiroshima; Masayoshi Sannomiya, Hiroshima; Toshiro Kondo, Hatsukaichi; Atsushi Nishiyama, Hiroshima, all of Japan

[73] Assignee: Mazda Motor Corporation, Hiroshima, Japan

[21] Appl. No.: 550,173

[22] Filed: Jul. 9, 1990

[30] Foreign Application Priority Data

Jul. 7, 1989 [JP] Japan .................. 1-174275
Jul. 20, 1989 [JP] Japan .................. 1-84494[U]
Apr. 27, 1990 [JP] Japan .................. 2-44539[U]

[51] Int. Cl.$^5$ .................................. B62D 21/00
[52] U.S. Cl. .................................. 280/788; 180/89.1; 296/188; 296/194
[58] Field of Search ............... 180/89.1; 280/781, 785, 280/788; 296/188, 194

[56] References Cited

U.S. PATENT DOCUMENTS

| | | | |
|---|---|---|---|
| 2,899,236 | 8/1959 | Hodkin | 296/204 |
| 4,542,934 | 9/1985 | Komatsu et al. | 296/194 |
| 4,919,474 | 4/1990 | Adachi et al. | 296/188 |

FOREIGN PATENT DOCUMENTS

| | | |
|---|---|---|
| 378219 | 9/1985 | European Pat. Off. |
| 196360 | 1/1990 | European Pat. Off. |
| 1430845 | 12/1969 | Fed. Rep. of Germany |
| 1630389 | 6/1971 | Fed. Rep. of Germany |
| 2255679 | 5/1974 | Fed. Rep. of Germany |

OTHER PUBLICATIONS

Patent Abstracts of Japan, vol. 13, No. 22 (M-786)(3370), Jan. 19, 1989.

*Primary Examiner*—Kenneth R. Rice

[57] ABSTRACT

A is a vehicle suspension mounting structure for mounting a suspension device to a vehicle body. At least the upper arm of the suspension device is constituted by two link members disposed to be spaced apart by a predetermined distance in the vertical direction of the vehicle body with respect to a vehicle wheel support member. The suspension mounting structure includes a mounting mechanism for mounting the rear end of the upper link member to a dash panel.

15 Claims, 17 Drawing Sheets

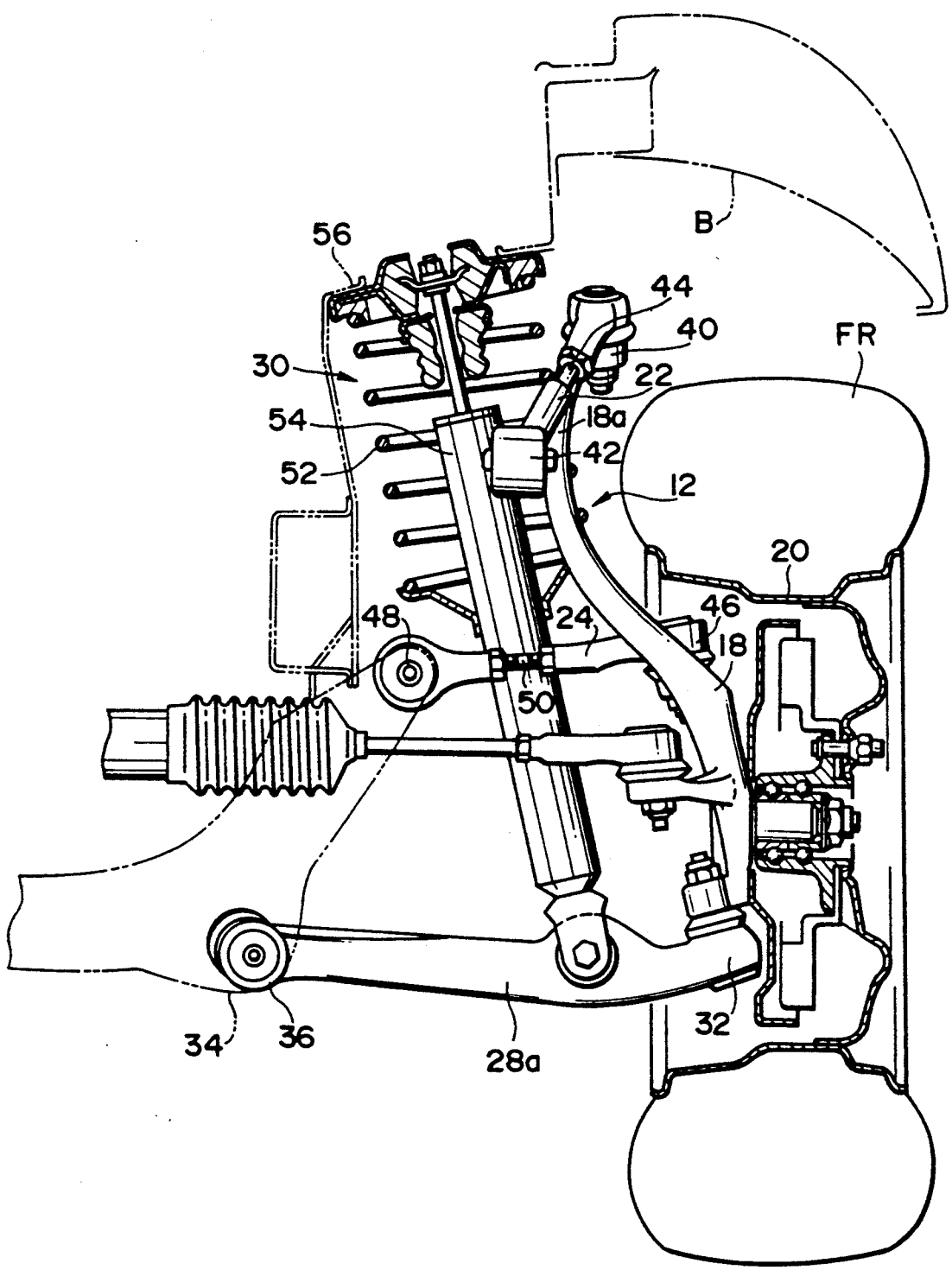
F I G. 4

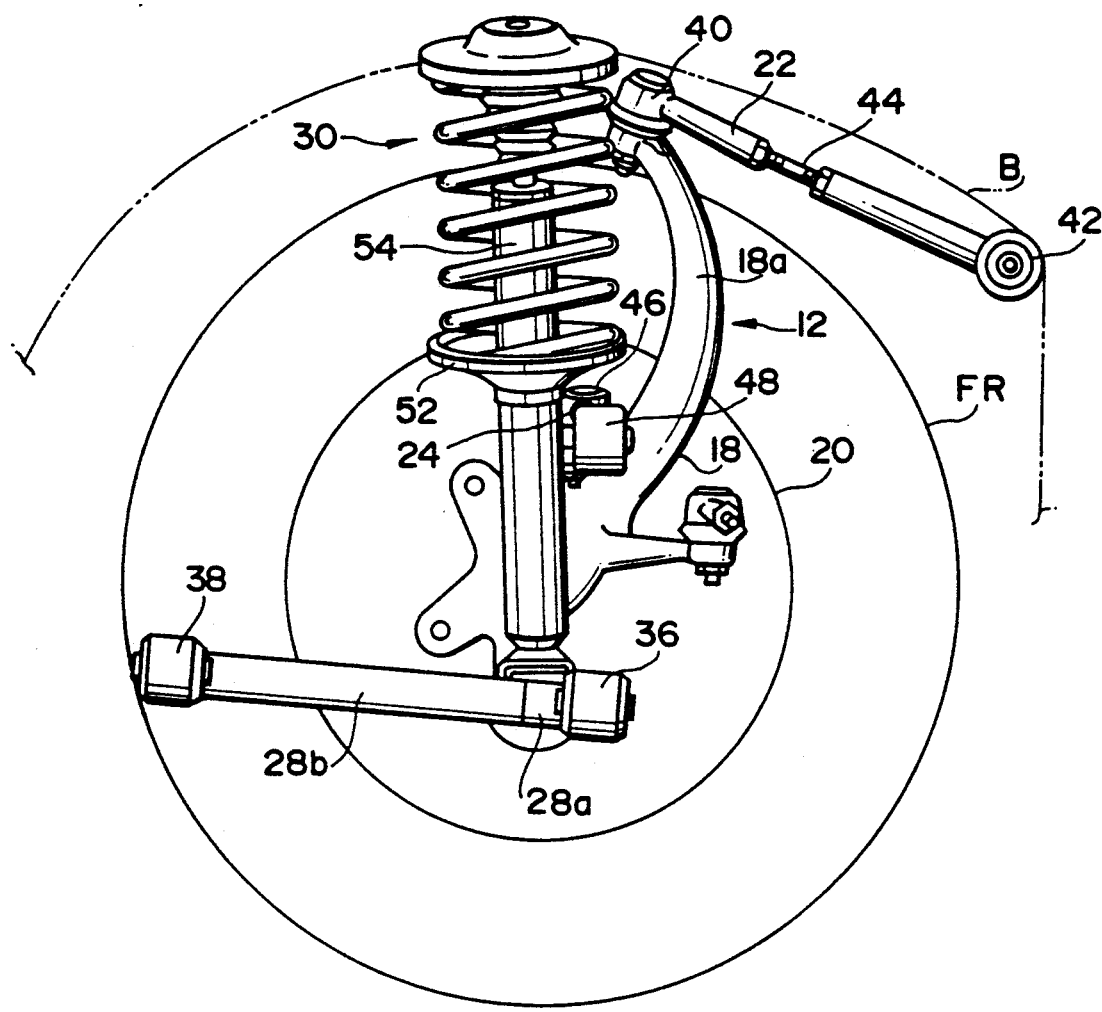
F I G. 5

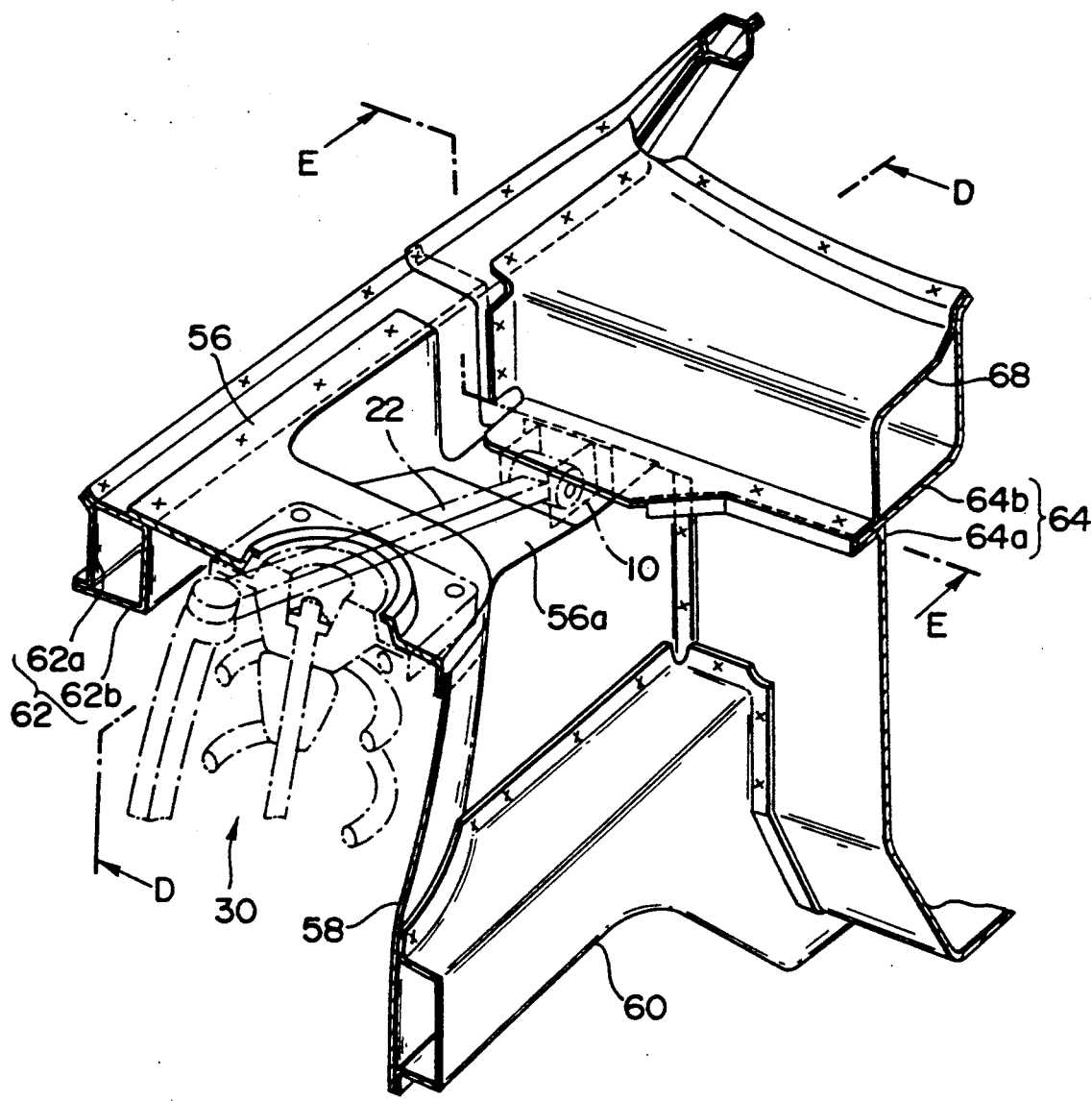
F I G. 9

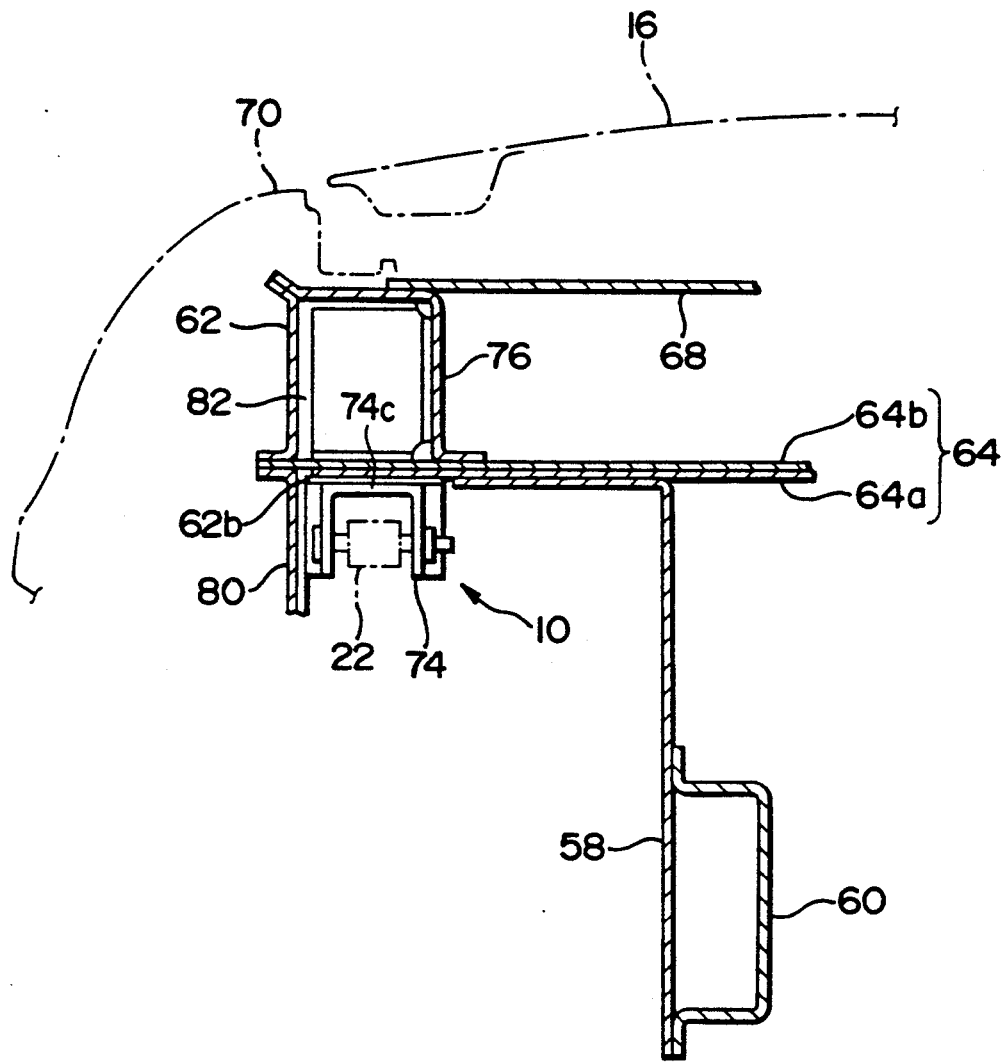
F I G. 15

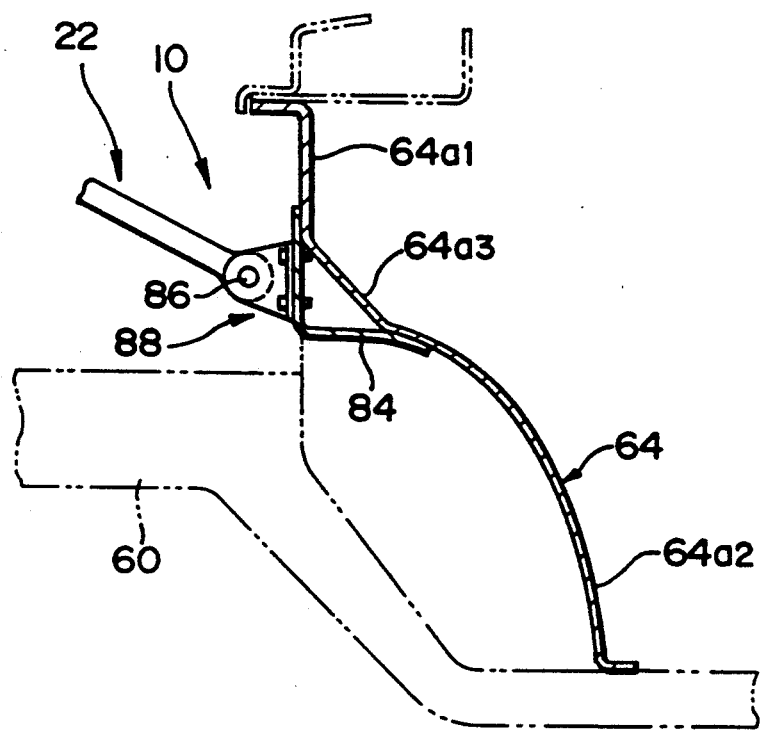
F I G. 17
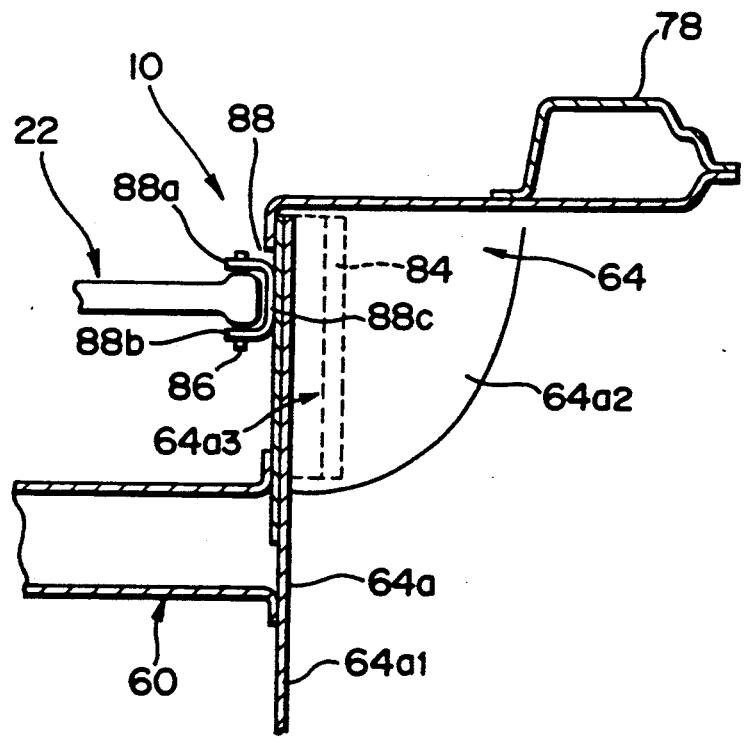
F I G. 18

1

VEHICLE SUSPENSION MOUNTING STRUCTURE

BACKGROUND OF THE INVENTION

The present invention relates to a vehicle suspension mounting structure arranged in a portion where a suspension device for suspending a vehicle body is mounted.

As a suspension device for a vehicle, for example, a so-called double-wishbone suspension device for supporting a vehicle wheel by A-shaped upper and lower arms is known, as disclosed in Japanese Utility Model Laid-Open No. 62-187904. In the double-wishbone suspension device, the position of a vehicle wheel is basically regulated by the upper and lower arms. For this reason, the relationships among the positions, arrangements, and lengths of these arms are selected to minimize squat upon starting of a vehicle or a change in camber angle or scuff when a vehicle wheel is moved in the vertical direction with respect to a vehicle body.

During travel of a vehicle, a shock load in the back-and-forth direction is input to a vehicle wheel due to a rough road surface. In the double-wishbone suspension device, since the upper arm (also the lower arm) is pivotally supported at two points, i.e., front and rear points, a rigidity in the direction of the shock load is increased. As a result, the shock is transmitted to the vehicle body, thus impairing riding comfort.

In order to eliminate the drawback of the riding comfort of the double-wishbone suspension device, elastic bushings in the two supporting portions of each arm are softened to decrease a support rigidity of a vehicle wheel in the back-and-forth direction. When the support rigidity is decreased, however, a support rigidity about a rotating shaft of a vehicle wheel is also decreased. As a result, the natural frequency of the support mechanism is decreased, and this causes resonation with a vibration of, e.g., a disk in a brake device provided to the vehicle wheel. In this manner, a so-called "brake jadder" undesirably occurs.

More specifically, in the double-wishbone suspension device having a normal structure, as disclosed in Japanese Utility Model Laid-Open No. 62-187904, riding comfort or brake jadder must be sacrificed, or both must be sacrificed to some extent.

To solve this problem, another structure is proposed. For example, as disclosed in Japanese Utility Model Publication No. 62-1762, a vehicle wheel support member is extended upward from a rim of a vehicle wheel, and an upper arm is mounted on the extended portion, so that a distance between the mounting point and the rotating shaft of the vehicle wheel is increased (a so-called high-mount double-wishbone suspension device). With this structure, the brake jadder can be prevented by a small force, and softer elastic bushings provided at two support points of the upper arm to the vehicle body can be used, thereby achieving both an improvement in riding comfort and prevention of brake jadder.

As described above, the so-called high-mount double-wishbone suspension device can achieve both improvement in riding comfort and prevention of brake jadder. However, another problem is posed.

More specifically, the upper arm of the double-wishbone suspension device comprises an A-shaped arm whose support points to a vehicle body are two points separated in the back-and-forth direction. In this manner, in order to allow the upper arm to swing in correspondence with vertical movement of a vehicle wheel, a wide space is required. However, it is difficult to assure a sufficient space since various parts must be arranged above the rim inside the vehicle wheel. For this reason, as shown in the drawing of the Japanese Utility Model Publication No. 62-1762, the length of the upper arm is decreased, and the upper arm must be obliquely arranged. When the length of the upper arm is decreased, a change in camber angle becomes too large upon vertical stroke of the vehicle wheel.

In order to eliminate the above drawbacks, the present applicant filed "Vehicle Suspension Device" as Japanese Patent Application Laid Open No. 1-4873 on Jan. 13, 1990. According to this prior art, in a vehicle suspension device which swingably supports, via upper and lower arms, a vehicle wheel support member for rotatably supporting a vehicle wheel with respect to a vehicle body, at least the upper arm is constituted by two link members disposed to be spaced apart by a predetermined distance in the vertical direction of the vehicle body with respect to the vehicle wheel support member, so that a displacement of the vehicle wheel support member in the back and forth direction of the vehicle body is mainly regulated by the upper link member, and a displacement of the vehicle wheel support member in the widthwise direction of the vehicle body is mainly regulated by the lower link member.

According to the vehicle suspension device disclosed in this prior art, both improvement in riding comfort and prevention of brake jadder can be achieved, and the change in camber angle can have a desired tendency.

However, in this suspension device, since a very large load acts on a mounting portion of the upper one of the two link members constituting the upper arm, if a mounting rigidity of this portion is low, a vibration which makes a driver and passengers uncomfortable is generated at the mounting portion.

SUMMARY OF THE INVENTION

The present invention has been made in consideration of the above situation and has as its object to provide a vehicle suspension mounting structure which can attain a sufficient mounting rigidity at a mounting portion of the above-mentioned vehicle suspension device, in which at least the upper arm is constituted by two link members disposed to be spaced apart by a predetermined distance in the vertical direction of a vehicle body with respect to a vehicle wheel support member when the vehicle suspension device is mounted on the vehicle body, and can effectively suppress generation of a vibration at the mounting portion which makes passengers uncomfortable.

In order to achieve the above object, according to the present invention, a vehicle suspension mounting structure for mounting a suspension device to a vehicle body, at least an upper arm of the suspension device being constituted by two link members disposed to be spaced apart by a predetermined distance in a vertical direction of the vehicle body with respect to a vehicle wheel support member, comprises mounting means for mounting a rear end of the upper link member to a dash panel.

In the suspension mounting structure of a first aspect of the present invention, the dash panel is constituted by dash panel upper and lower portions which are joined in the vertical direction, and the mounting means comprises a mounting bracket, mounted on the joint portion between the dash panel upper and lower portions, for axially and pivotally supporting the rear end of the upper link member.

In the suspension mounting structure of a second aspect of the present invention, a wheel apron is further joined to the joint portion.

In the suspension mounting structure of a third aspect of the present invention, a wheel apron and a cowl panel are further joined to the joint portion.

In the suspension mounting structure of a fourth aspect of the present invention, a suspension tower upper portion is further joined to the joint portion.

In the suspension mounting structure of a fifth aspect of the present invention, a suspension tower upper portion and a cowl panel are further joined to the joint portion.

In the suspension mounting structure of a sixth aspect of the present invention, a wheel apron reinforcement member for reinforcing a wheel apron is further joined to the joint portion.

The suspension mounting structure of a seventh aspect of the present invention, further comprises a reinforcement member fixed to a curved outer surface of a wheel apron to extend sideways from a front side frame along the curved outer surface of the wheel apron, and the mounting means comprises a mounting bracket, mounted to extend over the reinforcement member and the dash panel lower portion, for axially and pivotally supporting the rear end of the upper link member.

In the suspension mounting structure of an eighth aspect of the present invention, the reinforcement member is joined at one end to a wheel apron reinforcement member.

In the suspension mounting structure of a ninth aspect of the present invention, the reinforcement member is joined at the other end to a front side frame.

The suspension mounting structure of a tenth aspect of the present invention, further comprises a reinforcement member fixed to a bent portion of the dash panel lower portion, and the mounting means comprises a mounting bracket, mounted on the dash panel lower portion via the reinforcement member, for axially and pivotally supporting the rear end of the upper link member.

In the suspension mounting structure of an eleventh aspect of the present invention, the reinforcement member is fixed to a joint portion of a flat portion and a curved portion of the dash panel lower portion, which are joined to each other while being bent.

In the suspension mounting structure of a twelfth aspect of the present invention, the flat portion and the curved portion of the dash panel lower portion are joined to each other via an inclined surface, and the reinforcement member comprises a frame which is formed to have an L-shaped section so that a triangular closed section having the inclined surface as an oblique side is formed.

In the suspension mounting structure of a thirteenth aspect of the present invention, the mounting bracket is mounted on one surface of the reinforcement member.

According to the vehicle suspension mounting structure as described above, a mounting portion of the rear end of the upper link member is set at a dash panel, more specifically, a joint portion between dash panel upper and lower portions. The dash panel has a high rigidity. As a result, a sufficient mounting rigidity at the mounting portion can be attained, and the upper link member having a high rigidity can be reliably received, so that generation of a vibration at the mounting portion which makes passengers uncomfortable can be effectively suppressed. In particular, since the end portions of the dash panel upper and lower portions are bent and joined at their joint portion, a mounting rigidity at this joint portion can be further increased. As a result, a sufficient mounting rigidity at the mounting portion can be attained, and the upper link member having a high rigidity can be reliably received, so that generation of a vibration at the mounting portion which makes passengers uncomfortable can be effectively suppressed.

Furthermore, a suspension tower upper portion, or a wheel apron, or a cowl panel is further joined through the joint portion between the dash panel upper and lower portions, so that the mounting rigidity of this mounting portion can be further increased. As a result, generation of the vibration can be reliably prevented.

A mounting portion of the rear end of the upper link member, which extends backward along the back-and-forth direction of the vehicle body is supported by a reinforcement member which extends sideways from a front side frame along the curved outer surface of the wheel apron. A portion of the wheel apron where the reinforcement member is fixed is curved, and the rigidity of the curved portion can be increased by only this structure. Furthermore, since the reinforcement member is fixed to extend sideways from the frame along the curved outer surface of the wheel apron, its rigidity can be remarkably increased. As a result, the mounting portion of the upper link member can have a sufficient mounting rigidity, and the upper link member having a high rigidity can be reliably received. In this manner, generation of a vibration at the mounting portion which makes passengers uncomfortable can be effectively suppressed.

Furthermore, the mounting portion of the rear end of the upper link member, which extends backward along the back-and-forth direction of the vehicle body, is supported by a reinforcement member fixed to a bent portion of the dash panel. The dash panel portion where the reinforcement member is fixed is bent, and the rigidity of the bent portion can be increased by only this structure. Furthermore, since the reinforcement member is fixed to this bent portion, the rigidity can be remarkably increased. As a result, the mounting portion of the upper link member can have a sufficient mounting rigidity, and the upper link member having a high rigidity can be reliably received. In this manner, generation of a vibration at the mounting portion which makes passengers uncomfortable can be effectively suppressed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 3 through 5 are respectively a plan view, a rear view, and a side view when viewed outwardly from the interior of the vehicle body, showing in detail the structure of the suspension device shown in FIG. 2;

FIG. 9 is a perspective view showing a structure of the second embodiment of a vehicle suspension mounting structure according to the present invention;

FIG. 15 is a longitudinal sectional view taken along a line H - H of the suspension mounting structure shown in FIG. 12;

FIG. 17 is a longitudinal sectional view of the suspension mounting structure shown in FIG. 16;

FIG. 18 is a horizontal sectional view of the suspension mounting structure shown in FIG. 16;

DETAILED DESCRIPTION OF THE PREFERRED EMBODIMENTS

The first through fifth embodiments of a vehicle suspension mounting structure according to the present invention will be described hereinafter with reference to the accompanying drawings.

Figure 1:
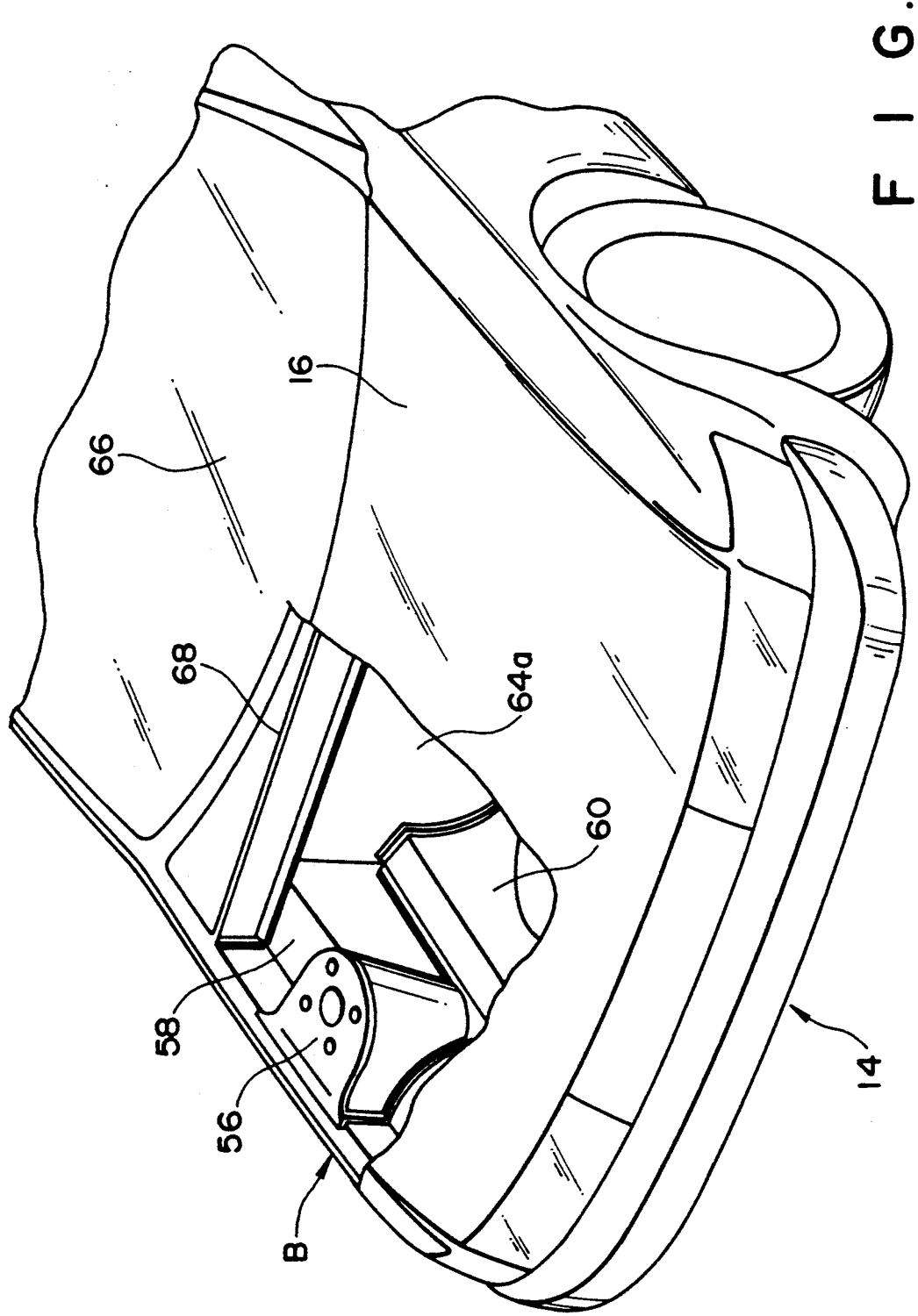
FIG. 1 is a partially cutaway perspective view of a structure of a vehicle to which a vehicle suspension mounting structure according to the present invention is applied.

FIG. 1 shows a vehicle 14 whose bonnet 16 is partially cut away and on which a suspension device 12 is mounted via a suspension mounting structure 10 according through one of the first to fifth embodiments. More specifically, the suspension device 12 mounted on a vehicle body B via the suspension mounting structure 10 is used for a front wheel. FIG. 1 illustrates the suspension device 12 for a front right wheel FR.

The structure of the suspension device 12 to be mounted on the vehicle body B via the suspension mounting structure 10 will be described below with reference to FIGS. 2 through 5.

FIGS. 2 through 5 are respectively a perspective view, a plan view, a rear view, and a side view when viewed outwardly from the interior of the vehicle body, showing the suspension device 12 for the front right wheel of the vehicle.

The front right wheel FR is rotatably supported by a vehicle wheel support member 18, and is coupled to the vehicle body B via the suspension device 12. In other words, the front right portion of the vehicle body B is suspended by the vehicle wheel support member 18 via the suspension device 12. The vehicle wheel support member 18 integrally comprises a first extending portion 18a extending upward from the uppermost end of a rim 20 of the front right wheel FR, as can be seen from FIGS. 2 through 5, and a second extending portion 18b which extends inwardly backward, and on which a tie rod T of a steering system is mounted to be pivotal about a vertical axis, as can be seen from FIGS. 2 through 4.

Figure 2:
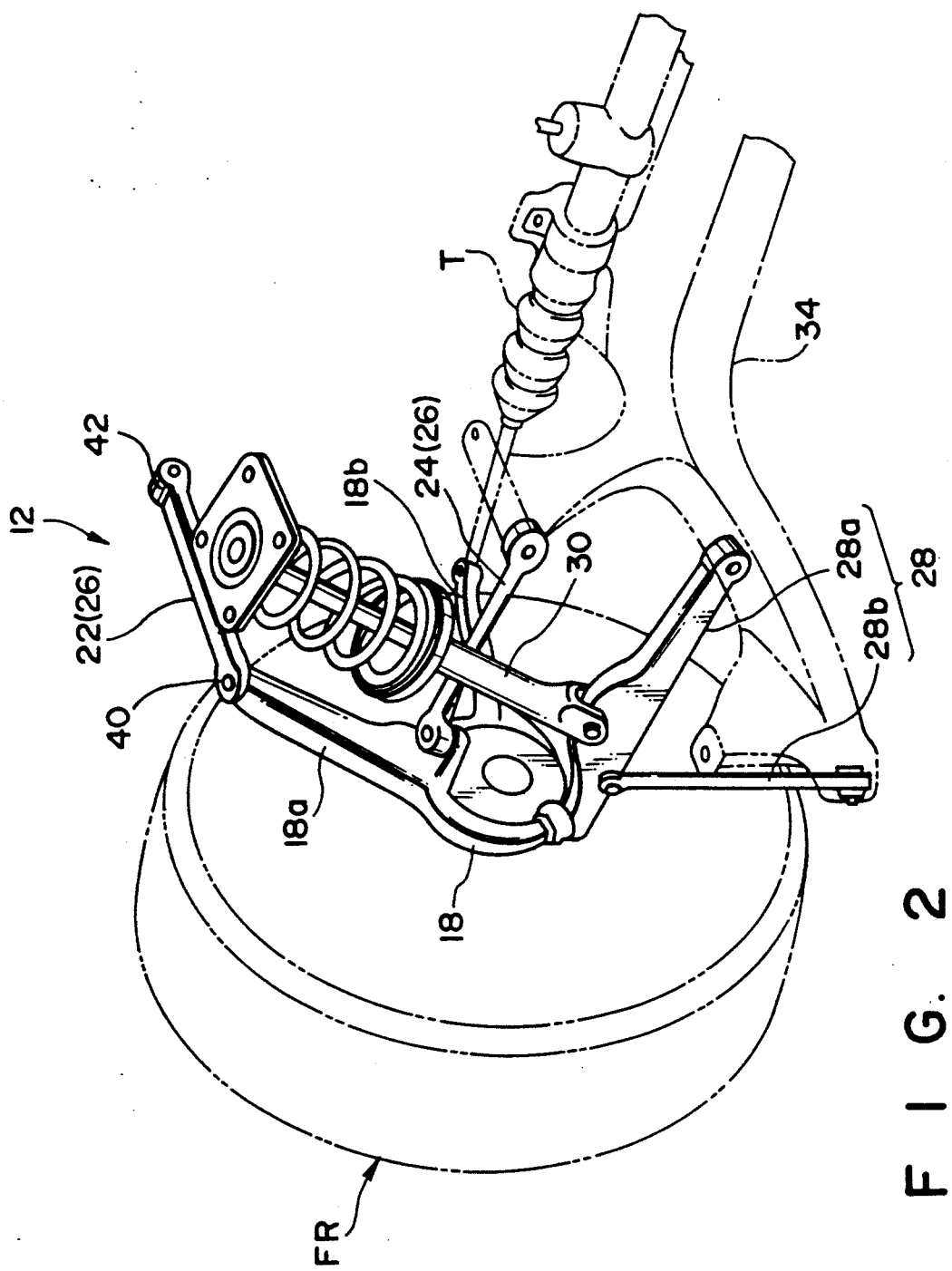
FIG. 2 is a perspective view showing a structure of a suspension device mounted on a vehicle body via the suspension mounting structure.

As shown in FIG. 2, the suspension device 12 comprises an upper arm 26 which is constituted by first and second upper arms 22 and 24 as link members connected to the vehicle wheel support member 18, a substantially A-shaped lower arm 28, and a shock absorber 30.

The A-shaped lower arm 28 is constituted by an I-shaped arm body 28a extending substantially along the widthwise direction of the vehicle body, and a tension link 28b firmly fixed to the distal end portion of the arm body 28a to define a predetermined steep angle with it. As shown in FIG. 4, one end of the arm body 28a constituting a top portion of the "A" shape is mounted on the lower end of the vehicle wheel support member 18 via a rubber bushing 32 to be rotatable substantially about the vertical axis.

Figure 3:
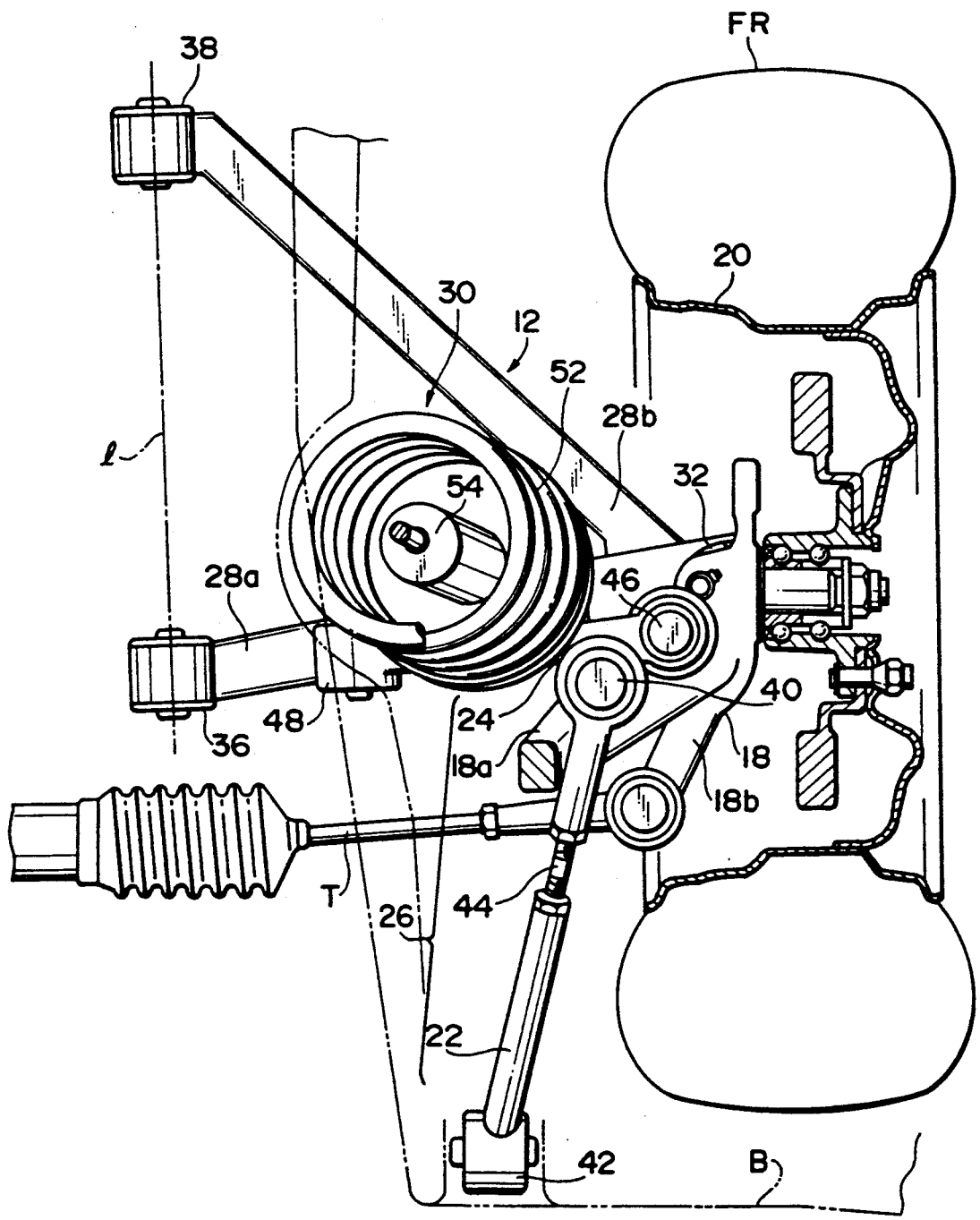

The other end of the arm body 28a constituting a bottom portion of the "A" shape and the other end portion of the tension link 28b are respectively mounted on a cross member 34 of the vehicle body B via rubber bushings 36 and 38 to be rotatable about a substantially horizontal axis extending in the back-and-forth direction of the vehicle body. The two rubber bushings 36 and 38 are disposed to be located along an axis 1 parallel to the central line of the vehicle body B, as shown in FIG. 3.

The A-shaped structure constituted by the arm body 28a and the tension link 28b of the lower arm 28 is suitable for a front-wheel driving vehicle since it can assure a space for arranging a drive axle. However, in a rear-wheel driving vehicle, since the drive axle need not be arranged in such a portion, the lower arm 28 need not be divided into two sections, and is integrally formed into an A shape.

The first upper arm 22 constituting the upper portion of the upper arm 26 regulates a displacement of the vehicle wheel support member 18 in the back-and-forth direction of the vehicle body. More specifically, one end of the first upper arm 22 is mounted on the upper end of the first extending portion 18a of the vehicle wheel support member 18 via a rubber bushing 40 to be rotatable substantially about the vertical axis.

The other end of the first upper arm 22 is mounted on the vehicle body B via the suspension mounting structure 10 as the characteristic feature of the present invention. As will be described in detail later, the other end of the first upper arm 22 is mounted on a specific portion of the vehicle body B via a rubber bushing 42 to be rotatable about a horizontal axis extending along the widthwise direction of the vehicle body. More specifically, the first upper arm extends backward from the vehicle wheel support member 18 substantially along the back-and-forth direction of the vehicle body above the uppermost end of the rim 20 of the front right wheel FR.

As can be seen from FIG. 5, the first upper arm 22 is arranged so that its rear portion with respect to the vehicle body is inclined toward a lower portion of the vehicle body. With this inclined arrangement, an instantaneous rotational center of the front right wheel FR defined by an axis for regulating a displacement of the vehicle wheel support member 18 of the lower arm 28 in the back-and-forth direction of the vehicle body, i.e., an axis connecting the rubber bushings 36 and 38 is set on the rear side of the front right wheel FR, thus achieving an anti-dive effect when the front right wheel FR is braked.

A turn buckle 44 is disposed in the middle portion of the first upper arm 22 arranged as described above. The length of the first upper arm 22 is adjusted via the turn buckle 44, thereby adjusting a castor angle of the front right wheel FR.

The second upper arm 24 extends in substantially the widthwise direction of the vehicle body, and regulates a displacement of the vehicle wheel support member 18 in the widthwise direction of the vehicle body. One end of the second upper arm 24 is mounted on a portion of the vehicle wheel support member 18 at a level lower than the uppermost end of the rim 20 of the front right wheel FR visa a rubber brushing 46 to be rotatable substantially about the vertical axis.

The other end of the second upper arm 24 is mounted on the cross member 34 of the vehicle body via a rubber bushing 48 to be rotatable about the horizontal axis extending in the back-and-forth direction of the vehicle body. The length of the second upper arm 24 is almost equal to that of the upper arm of a conventional unequal length link type double-wishbone suspension device, and is larger than an upper arm of Japanese Utility Model Publication No. 62-1762.

A turn buckle 50 is disposed in a middle portion of the second upper arm 24 arranged as described above. When the length of the second upper arm 24 is adjusted via the turn buckle 50, the camber angle of the front right wheel FR can be adjusted.

The above-mentioned shock absorber 30 comprises a coil spring 52 and a damper 54, and extends in the vertical direction. Note that the lower end of the damper 54 is mounted on the lower arm 28 to be pivotal about the horizontal axis extending in the back-and-forth direction of the vehicle body, and its upper end is rotatably mounted on a suspension tower upper portion 56 (FIG. 1). The coil spring 52 is fitted around the damper 54. The upper end of the coil spring 52 is fixed to the lower surface of the suspension tower upper portion 56, and its lower end is fixed to an almost middle portion of the damper 54.

Since the suspension device 12 is arranged as described above, it has the following effects.

(1) Since the first upper arm 22 is disposed above the uppermost end of the rim of the front right wheel FR, a distance between the support point of the vehicle wheel support member 18 of the first upper arm 22 and the rotational center of the front right wheel FR is prolonged. Therefore, the softer rubber bushing 40 for pivotally supporting the first upper arm 22 on the vehicle body B can be used. As a result, improvement of riding comfort and prevention of brake jadder can be attained at the same time.

(2) Since the first upper arm 22 as a member for regulating the displacement of the vehicle wheel support member 18 in the back-and-forth direction of the vehicle body extends along substantially the back-and-forth direction of the vehicle body, and the second upper arm 24 as a member for regulating a displacement of the vehicle wheel support member 18 in the widthwise direction of the vehicle body extends along substantially the widthwise direction of the vehicle body, caster and camber angles can be independently adjusted by adjusting the corresponding turn buckles 44 and 50 without interfering with each other.

(3) Since the first and second upper arms 22 and 24 are separated as described above, they can be disposed by effectively utilizing a space, thus allowing an improved layout.

(4) Since the second upper arm 24 as a member for regulating a displacement of the vehicle wheel support member 18 in the widthwise direction of the vehicle body is disposed below the uppermost end of the rim of the vehicle wheel, this portion has a relatively large space in a lateral direction. Therefore, the second upper arm 24 can be relatively prolonged, and hence, a change in camber angle can be optimized.

The first embodiment of the suspension mounting structure 10, as the characteristic feature of the present invention, for mounting the first upper arm 22 of the suspension device 12 arranged as described above to the vehicle body B will be described in detail below with reference to FIG. 1 and FIGS. 6 through 8.

A structure of the vehicle body B near a portion where a mounting bracket constituting this suspension mounting structure 10 will be briefly described below with reference to FIGS. 1 and 6.

Figure 6:
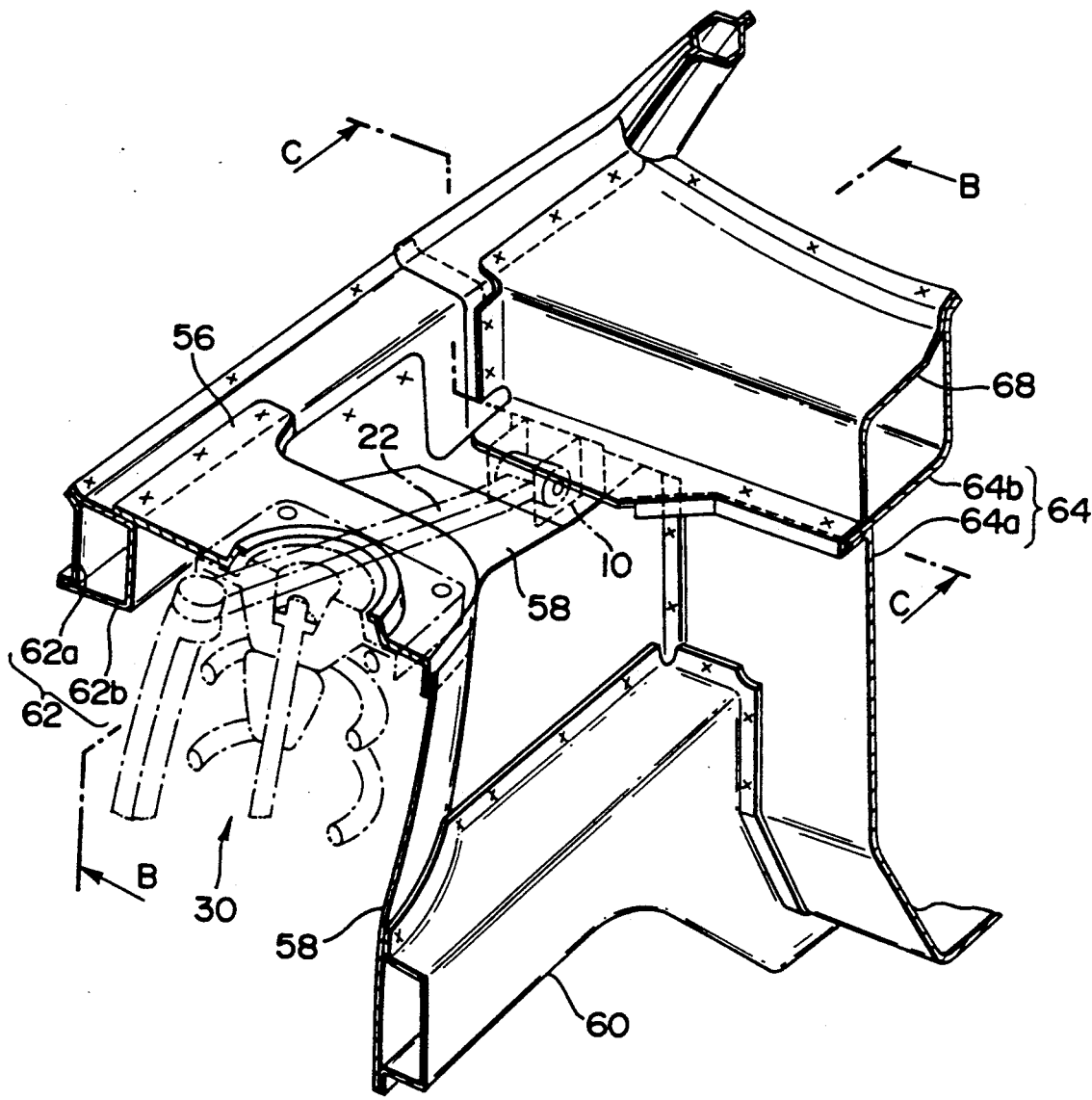
FIG. 6 is a perspective view showing a structure of the first embodiment of a vehicle suspension mounting structure according to the present invention.

In this vehicle body B, as shown in FIG. 6, the suspension tower upper portion 56 is formed on the upper end of a wheel apron 58 constituting a tire house storing the front right wheel FR, and is fixed to close an opening located above the shock absorber 30. The wheel apron 58 is fixed to a front side frame 60 extending along the back-and-forth direction on the right side of the lower portion of the vehicle body.

The wheel apron 58 and the suspension tower upper portion 56 are fixed to a wheel apron reinforcement member 62 extending along the back-and-forth direction above the right side portion of the vehicle body. The wheel apron reinforcement member 62 is constituted by a wheel apron reinforcement outer portion 62a and a wheel apron reinforcement inner portion 62b fixed to the inner portion of the portion 62a to form a closed section extending along the back-and-forth direction. The wheel apron 58 and the suspension tower upper portion 56 are fixed to the wheel apron reinforcement inner portion 62b.

In order to partition an engine room and a passenger's room, an upright dash panel 64 extending in the widthwise direction of the vehicle body is fixed to the front side frame 60 and the wheel apron 58. The dash panel 64 is constituted by a dash panel lower portion 64a extending upward substantially to a level of the wheel apron 58, and a dash panel upper portion 64b fixed to the upper end of the dash panel lower portion 64a and extending upward to the lower end of a front window glass 66.

The upper end of the dash panel lower portion 64a is bent forward. The lower end (i.e., front end) of the dash panel upper portion 64b is fixed to the upper surface of the bent portion to overlap it. On the other hand, the rear end of the wheel apron 58 is fixed to the lower surface of the bent portion to overlap it. The distal end of a cowl panel 68 is fixed to the upper surface of the front end of the dash panel upper portion 64b to overlap it.

Note that the cowl panel 68 constitutes a closed section extending along the widthwise direction of the vehicle body together with the dash panel upper portion 64b. The rear end of the cowl panel 68 is fixed to the rear end of the dash panel upper portion 64b to overlap it. The lower end of the front window glass 66 is terminated immediately above the rear end of the cowl panel 68.

Figure 8:
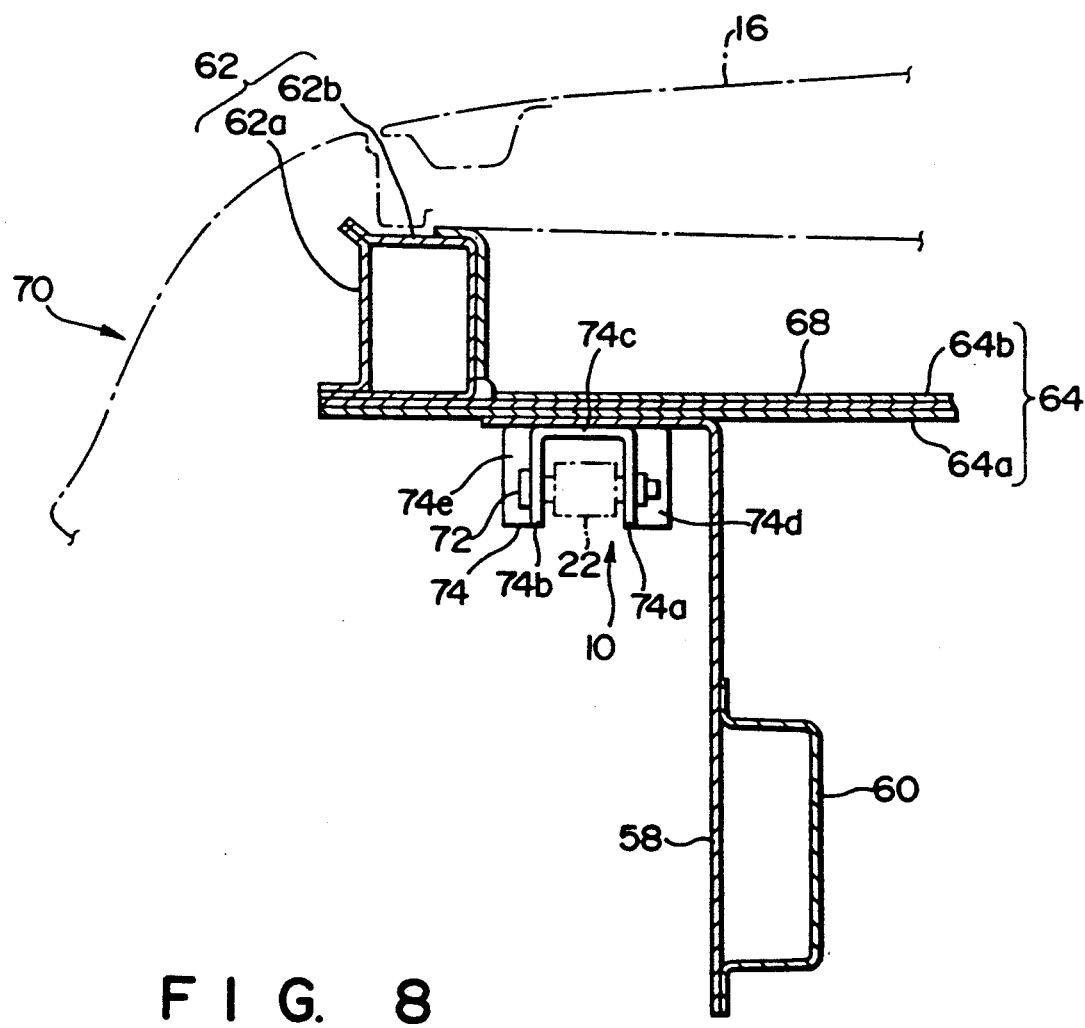
FIG. 8 is a longitudinal sectional view taken along a line C - C of the suspension mounting structure shown in FIG. 6.

As shown in FIG. 8, in the right side portion inside the vehicle body, the right end portion of the cowl panel 68 stands upright along the left side surface of the wheel apron reinforcement inner portion 62b, and is then bent outwardly to extend along its upper surface. The cowl panel 68 and the wheel apron reinforcement inner portion 62b are fixed to each other.

A joint portion between the dash panel lower and upper portions 64a and 64b extends below the wheel apron reinforcement inner portion 62b, and the lower surface of the wheel reinforcement inner portion 62b is fixed to the upper surface of the dash panel upper portion 64b. In this manner, the high rigidity of the dash panel 64 is guaranteed.

An inner end portion of a front fender panel 70 for defining the outer shape of the vehicle body B to be smoothly contiguous with the bonnet 16 is fixed to the upper surface of the wheel apron reinforcement inner portion 62b.

A fixing state of the mounting bracket for mounting the rear end of the first upper arm 22 of the suspension device 12 to the vehicle body B will be described in detail below with reference to FIGS. 6 through 8.

More specifically, the mounting structure 10 comprises a mounting bracket 74 for axially supporting the rear end of the first upper arm 22 to be rotatable about a horizontal pivot shaft 72 extending in the widthwise direction of the vehicle body. The mounting bracket 74 is formed into a U shape with an open lower surface when viewed from the front side, as can be seen from FIG. 8. More specifically, the mounting bracket 74 is constituted by two side plates 74a and 74b, and a top plate 74c for coupling the upper ends of the two side plates 74a and 74b. As can be seen from FIGS. 6 and 8, fixing bent segments 74d and 74e are integrally formed on the rear end portions of the two side plates 74a and 74b to be bent at 90 degrees, respectively.

The mounting bracket 74 is fixed such that it is located immediately below the joint portion between the dash panel lower and upper portions 64a and 64b, and its rear end is in contact with the front surface of the dash panel lower portion 64a. More specifically, the upper surface of the top plate 74c of the mounting bracket 74 is fixed to the lower surface of the wheel apron 58 fixed to the lower surface of the forward bent portion at the upper end of the dash panel lower portion 64a, and the rear surfaces of the bent segments 74d and 74e are fixed to the front surface of the dash panel lower portion 64a.

Figure 7:
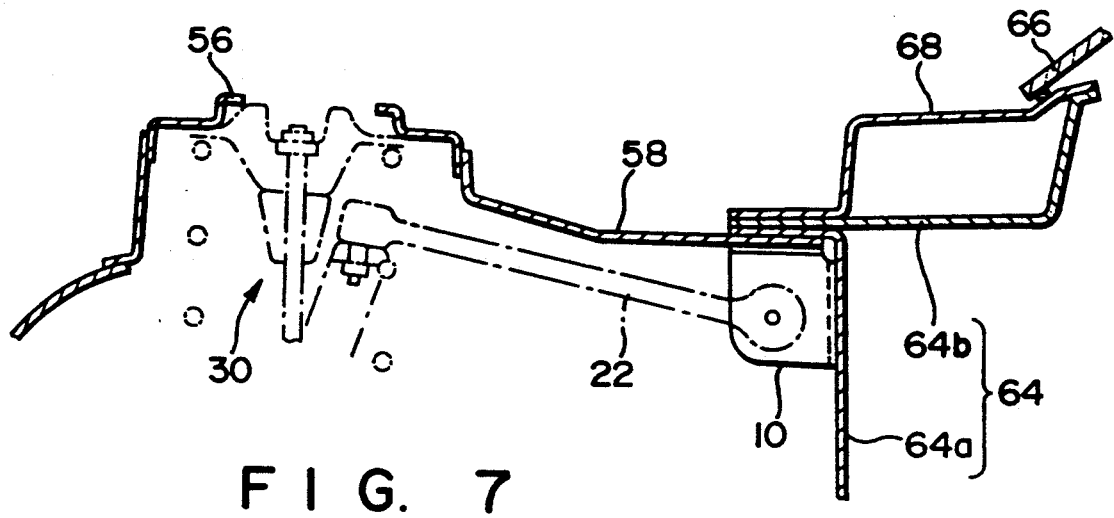
FIG. 7 is a longitudinal sectional view taken along a line B - B of the suspension mounting structure shown in FIG. 6.

A portion to which the top plate 74c of the mounting bracket 74 is fixed is a portion where a total of four members, i.e., the wheel apron 58, the dash panel lower portion 64a, the dash panel upper portion 64b, and the cowl panel 68 overlap in turn, as can be seen from FIGS. 7 and 8. As a result, the mounting rigidity of the fixing portion of the mounting bracket 74, in other words, the mounting portion of the first upper arm 22 is set to be very high.

In this manner, according to the first embodiment, since a sufficiently high mounting rigidity can be set for the mounting portion of the first upper arm 22, an excessive suspension force acting on the first upper arm 22 can be withstood, and generation of a vibration in this mounting portion which makes a driver and passengers uncomfortable due to an insufficient rigidity can be effectively suppressed.

The present invention is not limited to the arrangement of the first embodiment, and various changes and modifications may be made within the spirit and scope of the invention.

Figure 10:
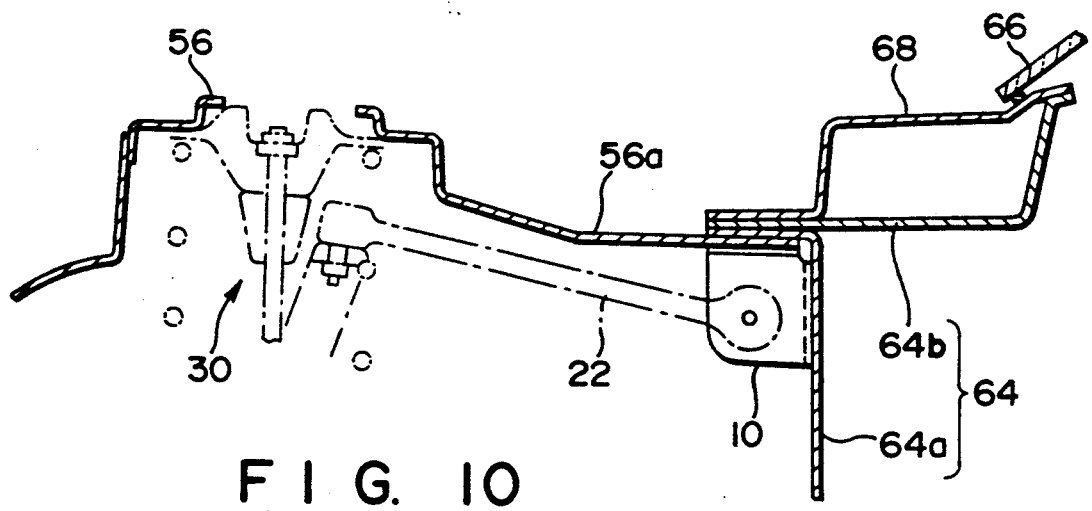
FIG. 10 is a longitudinal sectional view taken along a line D - D of the suspension mounting structure shown in FIG. 9.
Figure 11:
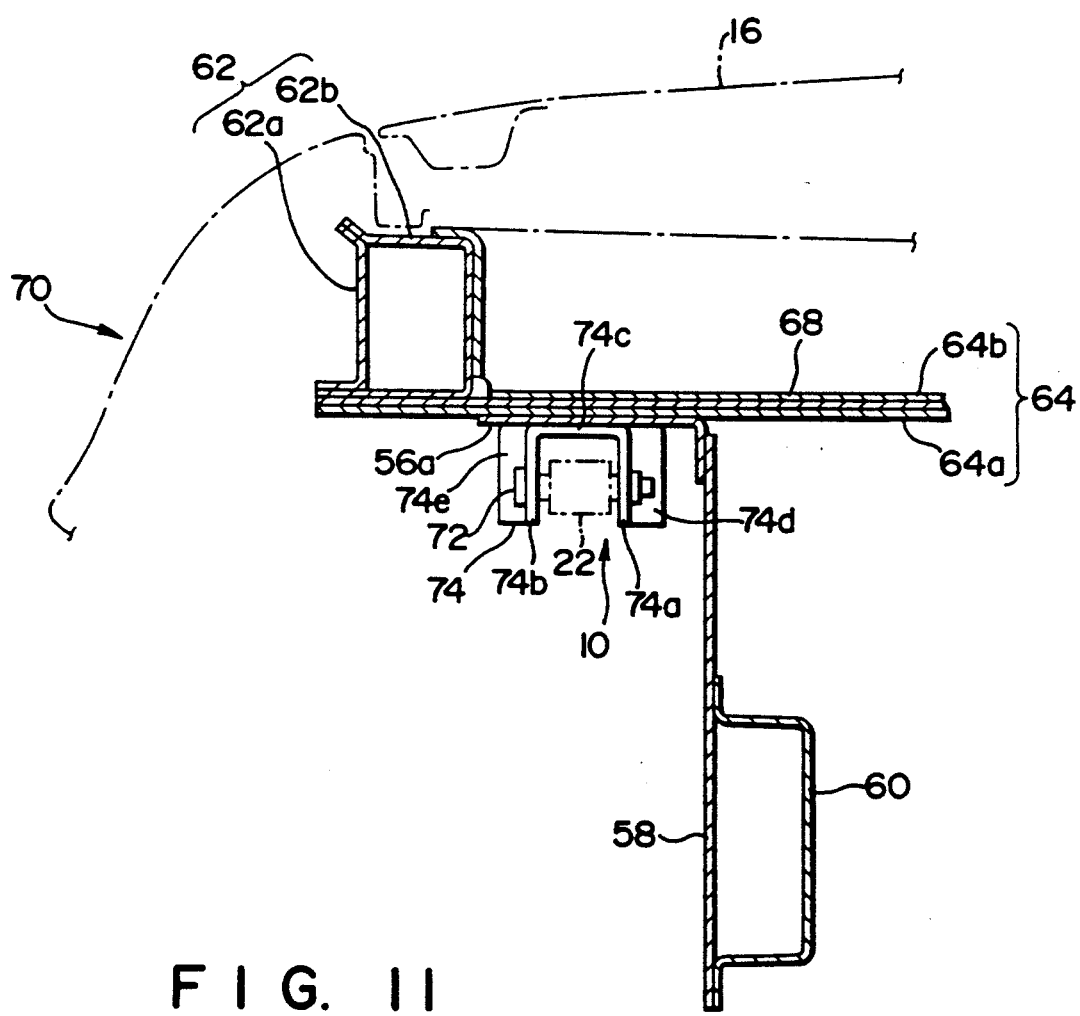
FIG. 11 is a longitudinal sectional view taken along a line E - E of the suspension mounting structure shown in FIG. 9.
Figure 12:
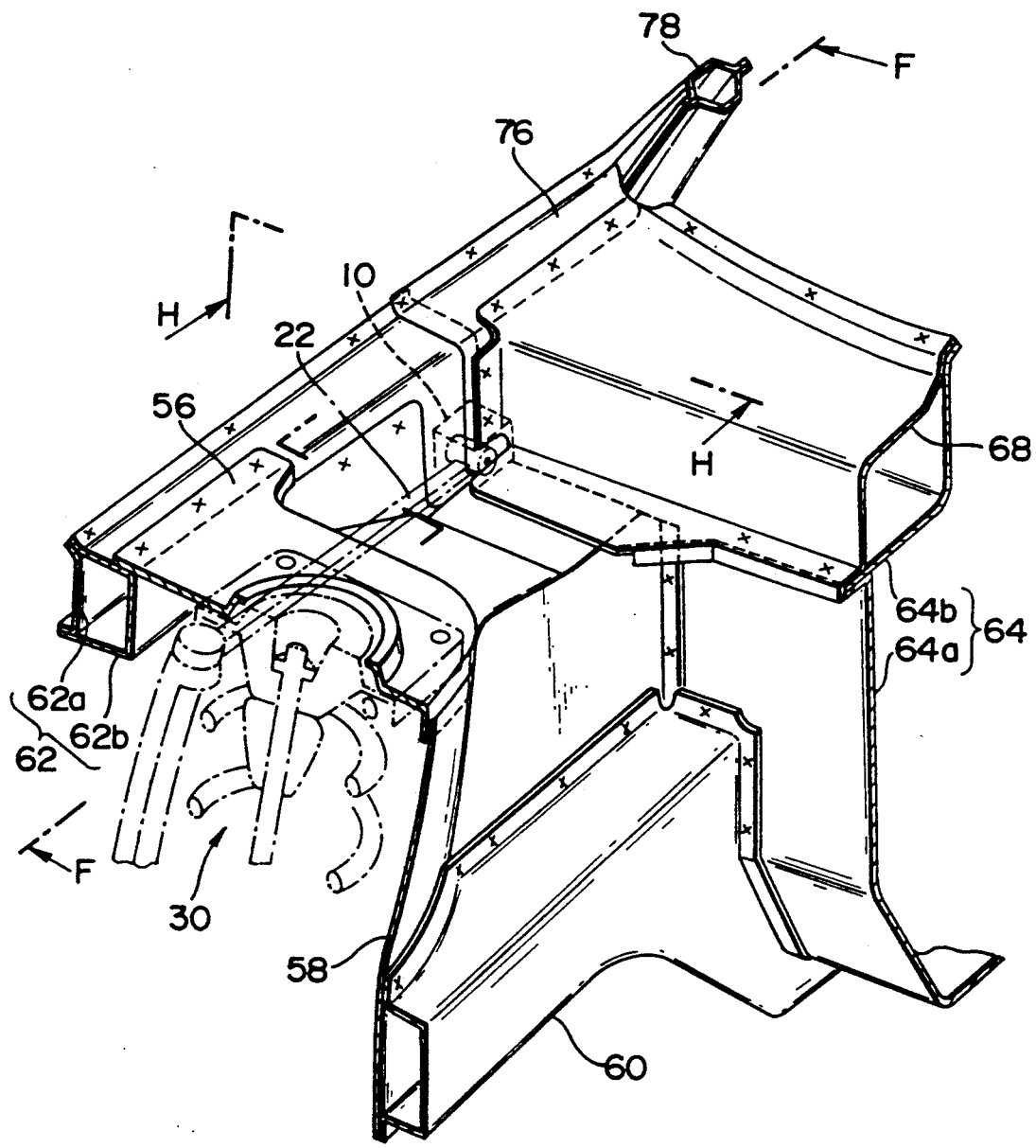
FIG. 12 is a perspective view showing a structure of the third embodiment of a vehicle suspension mounting structure according to the present invention.
Figure 13:
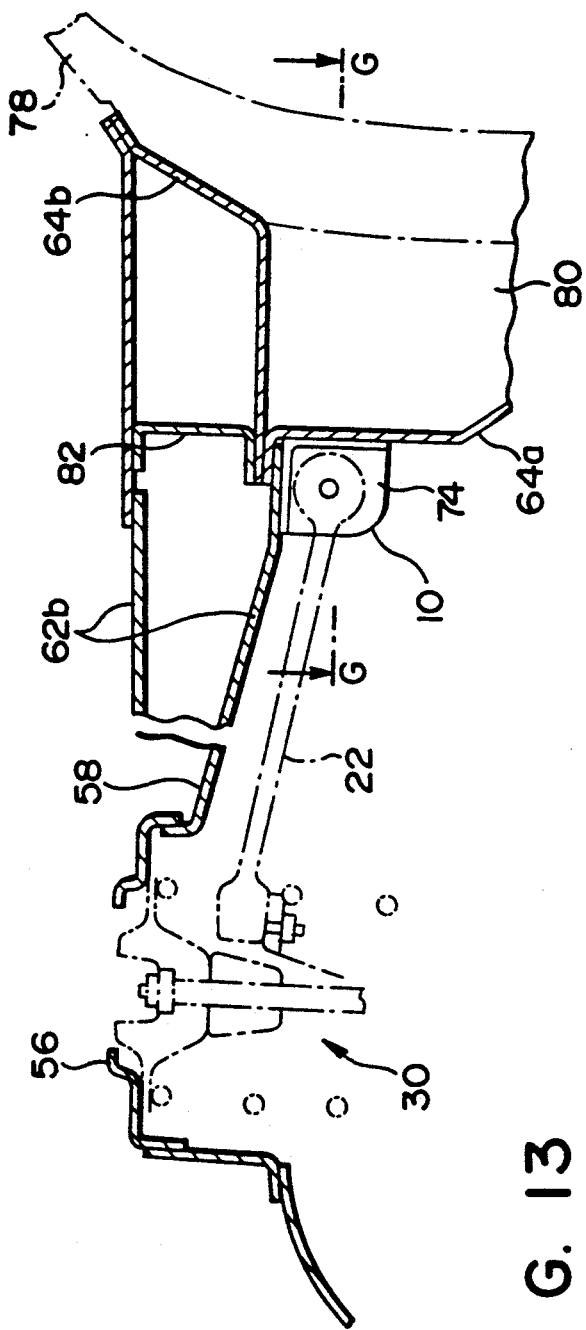
FIG. 13 is a longitudinal sectional view taken along a line F - F of the suspension mounting structure shown in FIG. 12.
Figure 14:
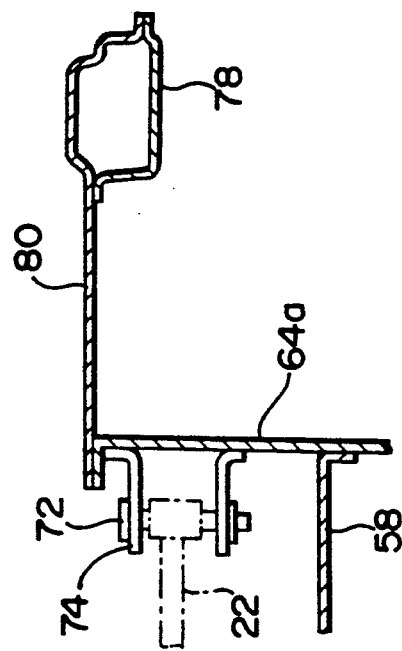
FIG. 14 is a longitudinal sectional view taken along a line G - G of the suspension mounting structure shown in FIG. 12.

For example, in the first embodiment, a mounting portion where the rear end of the first upper arm 22 is mounted, i.e., a portion where the mounting bracket 74 is fixed corresponds to a portion where a total of four members, i.e., the wheel apron 58, the dash panel lower portion 64a, the dash panel upper portion 64b, and the cowl panel 68 overlap in turn. However, the present invention is not limited to this arrangement. For example, this portion may be arranged, as shown in FIGS. 9 through 11 as the second embodiment. The arrangement of the second embodiment of a suspension mounting structure will be described below.

The same reference numerals in this embodiment denote the same parts as in the first embodiment described above, and a detailed description thereof will be omitted.

In the second embodiment, an arrangement of a mounting portion where the rear end of a first upper arm 22 is mounted is different from that in the first embodiment.

More specifically, as can be seen from FIG. 9, a wheel apron 58 is not fixed to a wheel apron reinforcement inner portion 62b on a portion behind a suspension tower upper portion 56, and its upper end is terminated while it merely stands upright from a portion where the apron 58 is fixed to a front side frame 60. As shown in FIG. 10, as the characteristic feature of the second embodiment, the rear end portion of the suspension tower upper portion 56 extends backward, and is terminated while the upper end of a dash panel lower portion 64a is joined to the lower surface of a portion which is bent forward.

The upper surface of the rear end of a backward extending portion 56a of the suspension tower upper portion 56 is fixed to the lower surface of the bent portion of the dash panel lower portion 64a, and the lower surface of the rear end of the backward extending portion 56a of the suspension tower upper portion 56 is fixed to the upper surface of a top plate 74c of a mounting bracket 74 described above.

The suspension tower upper portion 56 normally has a large thickness and a high bending rigidity to reliably withstand a thrust force from a suspension device 12. Therefore, in the second embodiment, a fixing portion between the backward extending portion 56a of the thick suspension tower upper portion 56 and the dash panel lower portion 64a (of course, a dash panel upper portion 64b and a cowl panel 68 are fixed to each other) is defined as a mounting portion of the mounting bracket 74, thus attaining a higher mounting rigidity than that in the first embodiment.

As can be seen from FIG. 11, the upper end of the wheel apron 58 is fixed to a downward bent portion at the side edge of the backward extending portion 56a of the suspension tower upper portion 56 behind the suspension tower upper portion 56. In this manner, the rigidity of the wheel apron 58 can be guaranteed.

The present invention is not limited to the arrangement of the first embodiment described above, and may be modified as shown in FIGS. 12 through 15 as the third embodiment.

The arrangement of the third embodiment of a suspension mounting structure will be described below. In the suspension mounting structure of the third embodiment, a mounting bracket 74 is not fixed to a portion where a total of four members, i.e., a wheel apron 58, a dash panel lower portion 64a,, a dash panel upper portion 64b, and a cowl panel 68 overlap in turn, but is displaced outwardly sideways as compared to the mounting position in the first embodiment, as can be seen from FIG. 15. That is, the mounting bracket 74 is disposed immediately below a wheel apron reinforcement member 62.

In other words, in the third embodiment, the mounting bracket 74 is fixed to a joint portion where the dash panel lower portion 64a, the dash panel upper portion 64b, and the wheel apron reinforcement member 62, which forms a closed section together with the dash panel lower portion 64a, overlap in turn. More specifically, the upper surface of a top plate 74c of the mounting bracket 74 is fixed to the lower surface of a wheel apron reinforcement inner portion 62b.

In this manner, in the third embodiment, a mounting strength at the mounting position of the rear end portion of a first upper arm 22 of a suspension device 12, i.e., the mounting rigidity of the mounting bracket 74 can be set to be higher than those in the first and second embodiments, and a desired effect can be satisfactorily attained.

In FIGS. 12 through 15, reference numeral 76 denotes a cowl plate upper portion; 78, a front pillar; 80, a cowl side panel; and 82, a baffle plate.

The arrangement of the fourth embodiment of the suspension mounting structure 10 will be described in detail below with reference to FIG. 1 and FIGS. 16 through 18.

As in the first embodiment described above, a dash panel 64 for partitioning an engine room and a passenger's room stands upright behind a wheel apron 58 to be continuous with it. The dash panel 64 is constituted by a dash panel lower portion 64a, and a dash panel upper portion 64b contiguous with the upper portion of the dash panel lower portion 64a.

In the fourth embodiment, the dash panel lower portion 64a is constituted by a flat portion 64$a_1$ located at the central portion in the widthwise direction of a vehicle body, and curved portions 64$a_2$ which are integrally formed on two sides of the flat portion 64$a_1$ and constitute rear portions of the corresponding tire houses. More specifically, paying attention to the front right wheel, the curved portion 64$a_2$ defines a tire house portion as a curved surface portion (i.e., a curved portion) which is smoothly curved along the outer periphery of the front right wheel FR. As can be apparent from FIG. 18, the right side of the dash panel lower portion 64a is fixed to the pillar 78 described above, and constitutes a closed section extending along substantially the vertical direction of the vehicle body together with the pillar 78.

As described above, each tire house portion 64$a_2$ of the dash panel lower portion 64a is constituted by a curved portion extending along the front right wheel FR. As a result, the rigidity of this tire house portion 64$a_2$ is high as compared to a flat member.

Figure 16:
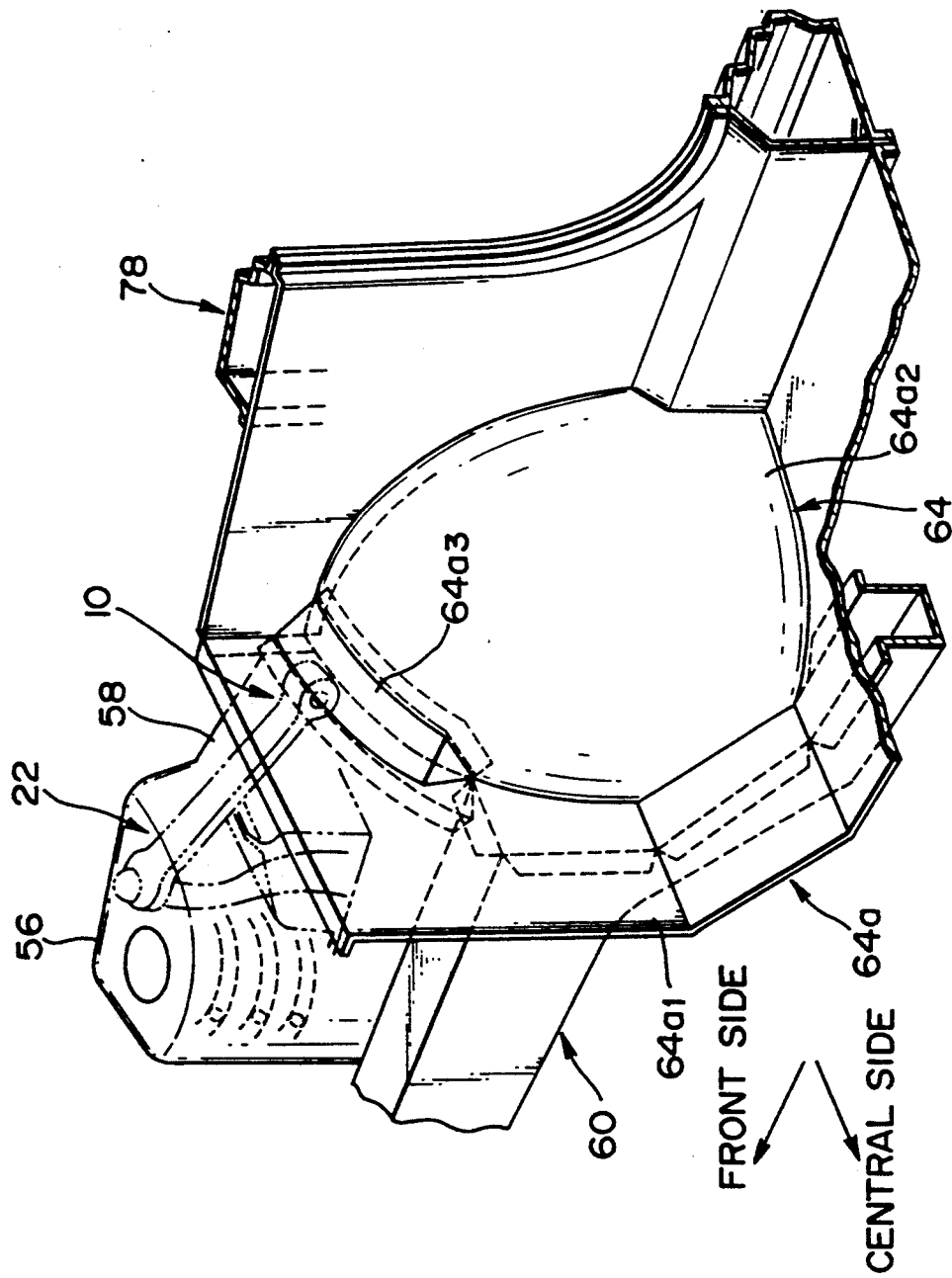
FIG. 16 is a perspective view showing a structure of the fourth embodiment of a vehicle suspension mounting structure according to the present invention.

As can be seen from FIGS. 16 and 18, the dash panel lower portion 64a is partially joined to a front side frame 60, thus increasing its mounting rigidity. As can be seen from FIG. 17, a contiguous portion between the flat portion 64$a_1$ and the tire house portion 64$a_2$ (i.e., a bent portion) defines an inclined surface 64$a_3$ within a predetermined range extending sideways at a portion located above the front side frame 60. The sectional shape of the dash panel lower portion 64a is designed to include the inclined surface 64$a_3$, so that the rigidity at the contiguous portion between the flat portion 64$a_1$ and the tire house portion 64$a_2$ of the dash panel lower portion 64a can be remarkably increased.

In the fourth embodiment, as shown in FIG. 17, a reinforcement member 84 is mounted to form a triangle so that the above-mentioned inclined surface 64$a_3$ is defined as an oblique side, its upper end is connected to the flat portion 64$a_1$, and the other end is connected to the tire house portion 64$a_2$. More specifically, the reinforcement member 84 is formed to have an L-shaped section, and is fixed to the outer surface of the dash panel lower portion 64a so that its inner end portion is contiguous with the front side frame 60, and the member 84 extends outwardly sideways along the outer surface of the dash panel lower portion 64a. Since the reinforcement member 84 described above is fixed to the outer surface of a rigidity increased portion of the dash panel lower portion 64a, the rigidity of the reinforcement member 84 can be remarkably increased.

A fixing state of a mounting bracket for mounting the rear end of the first upper arm 22 in the suspension device 12 to a vehicle body B will be described in detail below with reference to FIGS. 16 through 18.

The mounting structure 10 comprises a mounting bracket 88 for axially supporting the rear end of the first upper arm 22 to be rotatable about a horizontal pivot shaft 86 extending in the widthwise direction of the vehicle body. As can be seen from FIG. 18, the mounting bracket 88 is formed into a substantially U shape with an open lower surface when viewed from the top. More specifically, the bracket 88 is constituted by two side plates 88a and 88b, and a coupling plate 88c for coupling rear edges of the two side plates 88a and 88b. The coupling plate 88c is fixed to the front surface of the reinforcement member 84. The pivot shaft 86 is axially supported to extend between the two side plates 88a and 88b of the mounting bracket 88.

In the fourth embodiment, since the mounting rigidity of the first upper arm 22 is set to be sufficiently high, an excessive suspension force acting on the first upper arm 22 can be withstood, and generation of a vibration in this mounting portion which makes a driver and passengers uncomfortable due to an insufficient rigidity can be effectively suppressed.

In the fourth embodiment, the reinforcement member 84 is fixed to only the outer surface of the dash panel lower portion 64a. However, the present invention is not limited to this arrangement. As will be described later in the fifth embodiment, the two ends of the reinforcement member may be joined to the wheel apron reinforcement member 62 and the front side frame 60.

The fifth embodiment of the vehicle suspension mounting structure according to the present invention will be described below with reference to FIGS. 19 through 23.

Figure 19:
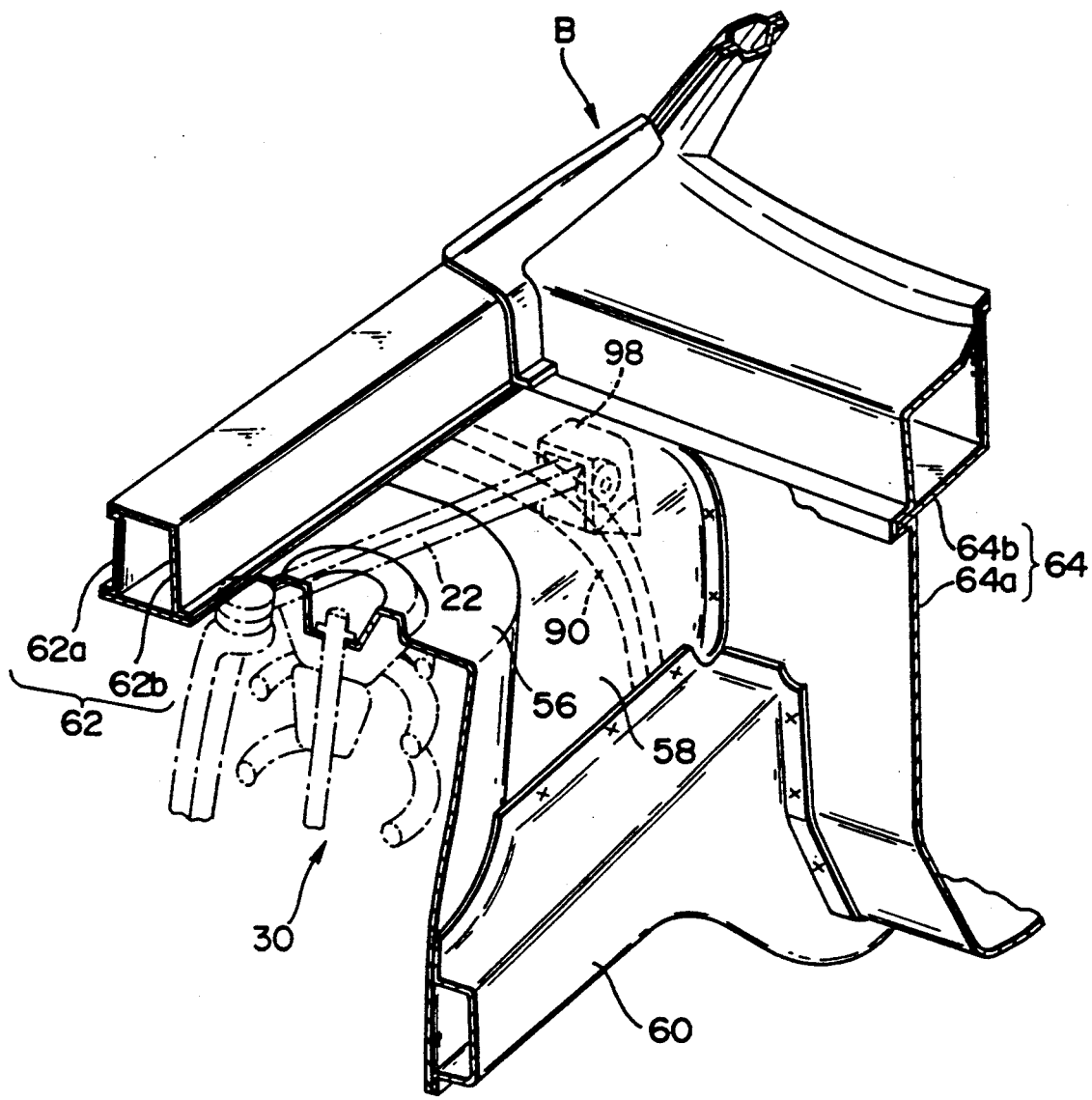
FIG. 19 is a partially cutaway, schematic perspective view of a structure of the fifth embodiment of a suspension mounting structure according to the present invention.

In the fifth embodiment, as shown in FIG. 19, a wheel apron reinforcement member 62 is fixed to the outer end of a wheel apron 58 to extend along the back-and-forth direction of a vehicle body B. In the fifth embodiment, a reinforcement member 90 extends in the widthwise direction of the vehicle body B while being fixed to the outer surface of the wheel apron 58, so that its one end, i.e., an outer end portion is fixed to the wheel apron reinforcement member 62, and its other end, i.e., an inner end portion is fixed to a front side frame 60.

Figure 20:
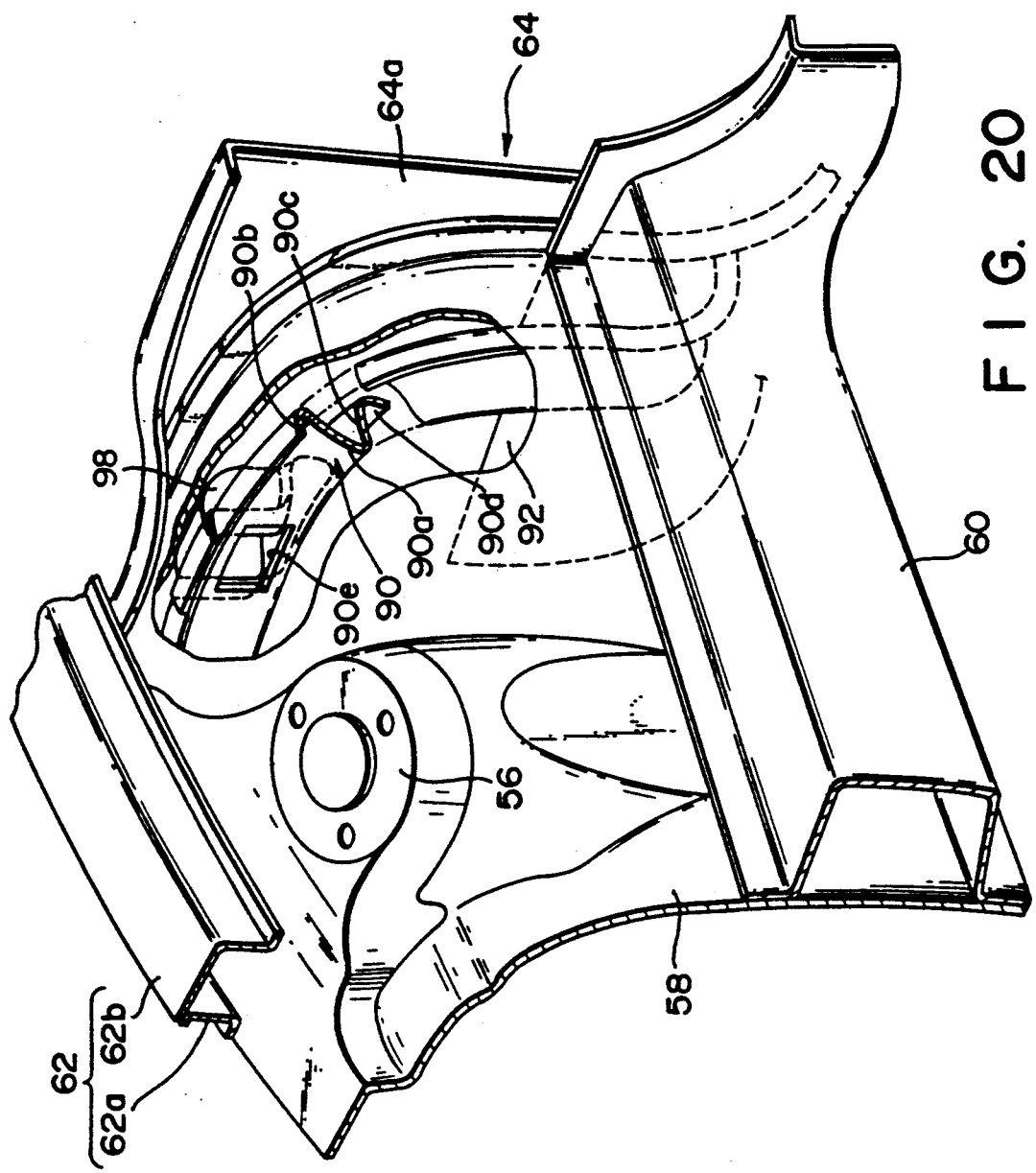
FIG. 20 is a partially cutaway perspective view of a reinforcement structure of a mounting bracket shown in FIG. 19 where the rear end of a first upper arm of a suspension device is mounted.

More specifically, as shown in FIG. 20, the reinforcement member 90 is formed to be curved with a large radius, so that it extends along the widthwise direction of the vehicle body B and is fixed to a portion of the lower surface of the wheel apron 58, which portion is located between a suspension tower upper portion 56 and a dash panel 64. The lower end (i.e., inner end portion) of the reinforcement member 90 is formed to be slowly bent so that the lower end is directed backward from a portion located aside the front side frame 60. The lower end of the member 90 extends to a position immediately below a torque box 92 (to be described later). The outer end portion (i.e., upper end) of the reinforcement member 90 extends to a position below the outer end portion of the wheel apron 58 reinforced by the wheel apron reinforcement member 62.

As is apparent from FIG. 20, the reinforcement member 90 has a crank-like sectional shape having three bent portions. More specifically, the reinforcement member 90 is integrally formed by a front surface portion 90a which stands upright on the extending surface of the wheel apron 58, a first joint portion 90b which is bent along the edge of the front surface portion 90a near the wheel apron 58, and is in surface contact with the lower surface of the wheel apron 58, a backward extending portion 90c which is bent to extend backward from the side edge of the front surface portion 90a opposite to the side on which the wheel apron 58 is mounted, and a second joint portion 90d which is bent along the rear end of the backward extending portion 90c and is in surface contact with the front surface of the dash panel lower portion 64a.

The reinforcement member 90 is fixed to the lower surface of the wheel apron 58 at its first joint portion 90b, and is fixed to the front surface of the dash panel lower portion 64a at its second joint portion 90d. The backward extending portion 90c and the second joint portion 90d are terminated at their lower ends where they are slowly bent backward. At the lower ends, only the front surface portion 90a and the first joint portion 90b extend backward.

Figure 21:
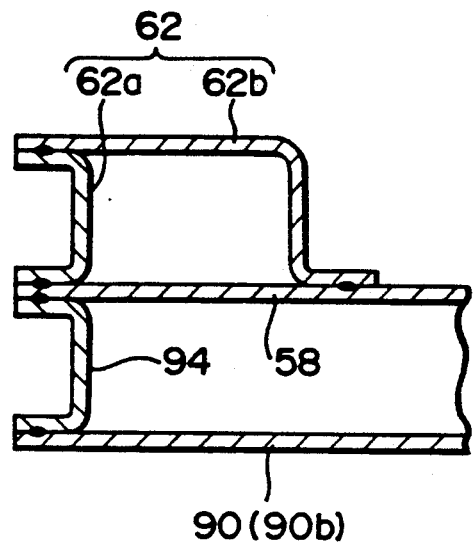
FIG. 21 is a longitudinal sectional view showing a fixing state of the outer end portion of a reinforcement member shown in FIG. 20.
Figure 22:
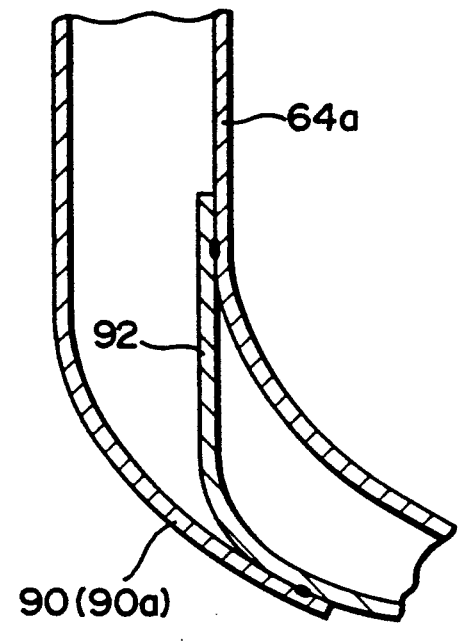
FIG. 22 is a longitudinal sectional view showing a fixing state of the inner end portion of the reinforcement member shown in FIG. 20.

The wheel apron reinforcement member 62 is integrally constituted by a wheel apron reinforcement outer member 62a and a wheel apron reinforcement inner member 62b, and is integrally fixed onto the outer end of the wheel apron 58. The upper surface of the outer end portion of the first joint portion 90b of the reinforcement member 90 is fixed, via a closing plate 94, to the lower surface of the outer end of the wheel apron 58 reinforced by the wheel apron reinforcement member 62, as shown in FIG. 21.

The lower end of a dash panel lower portion 64a is bent backward, as described above. The first joint portion 90b at this lower end is fixed to the upright surface of the front side frame 60, and the upper surface of the front surface portion 90a at the lower end is fixed to the lower surface of the torque box 92 described above, as shown in FIG. 22. The torque box 92 reinforces the bent portion of the dash panel lower portion 64a. One end, i.e., an outer end portion of the torque box 92 is fixed to a side sill (not shown), and its other end, i.e., an inner end portion is fixed to the front side frame 60.

Figure 23:
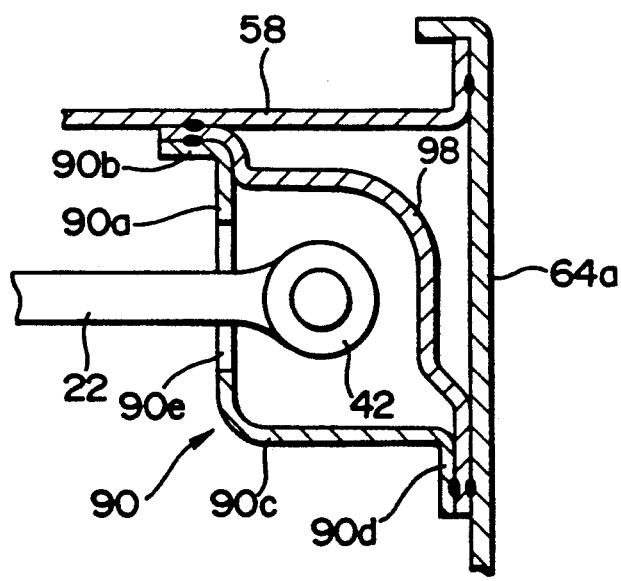
FIG. 23 is a longitudinal sectional view showing a mounting state of the mounting bracket in the fifth embodiment.

The front end (upper end) of a mounting bracket 98 which axially supports the rear end portion of the first upper arm 22 is fixed to the wheel apron 58 and the first joint portion 90b of the reinforcement member 90 to be clamped therebetween, as shown in FIG. 23. The rear end (lower end) of the bracket 98 is fixed to the dash panel lower portion 64a and the second joint portion 90d of the reinforcement member 90 to be clamped therebetween. In this manner, in the fifth embodiment, the mounting bracket 98 is joined to the wheel apron 58 and the dash panel lower portion 64a, and the corresponding joint portions are reinforced by the reinforcement member 90. In other words, the mounting bracket 98 is mounted on a portion reinforced by the reinforcement member 90.

In the fifth embodiment, since the mounting bracket 98 is located behind the reinforcement member 90, the first upper arm 22 attached to the mounting bracket 98 must extend backward through the reinforcement member 90. For this reason, a through hole 90e through which the rear end of the first upper arm 22 is inserted is formed in the front surface portion 90a of the reinforcement member 90, as shown in FIGS. 20 and 23.

Since the fifth embodiment is arranged as described above, the mounting bracket 98 which axially supports the rear end of the first upper arm 22 is mounted while its mounting strength is enhanced by the reinforcement member 90 at a position near a joint portion of the wheel apron 58 and the dash panel lower portion 64a. As a result, in the fifth embodiment, the mounting strength of the mounting bracket 88 to which the rear end of the first upper arm 22 is mounted is increased, and a suppression effect of a vibration generated in the suspension device 12 can be improved. In addition, since the reinforcement member 90 extends along the widthwise direction of the vehicle body, vibration dispersion characteristics can also be improved.

As many apparently widely different embodiments of the present invention can be made without departing from the spirit and scope thereof, it is to be understood that the invention is not limited to the specific embodiments thereof except as defined in the appended claims.

WHAT IS CLAIMED IS:

1. A vehicle suspension mounting structure for mounting a suspension device to a vehicle body, at least an upper arm of said suspension device being constituted by two link members disposed to be spaced apart by a predetermined distance in a vertical direction of said vehicle body with respect to a vehicle wheel support member, said suspension mounting structure comprising:
  mounting means for mounting a rear end of said upper link member to a dash panel.

2. The suspension mounting structure according to claim 1, wherein said dash panel is constituted 3. The suspension mounting structure according to claim 2, wherein
said mounting means comprises a mounting bracket, mounted on the joint portion between said dash panel upper and lower portions, for axially and pivotally supporting the rear end of said upper link member.

4. The suspension mounting structure according to claim 3, wherein
a wheel apron is further joined to said joint portion.

5. The suspension mounting structure according to claim 4, wherein
a cowl panel is further joined to said joint portion.

6. The suspension mounting structure according to claim 3, wherein
a suspension tower upper portion is further joined to said joint portion.

7. The suspension mounting structure according to claim 6, wherein
a cowl panel is further joined to said joint portion.

8. The suspension mounting structure according to claim 3, wherein
a wheel apron reinforcement member for reinforcing a wheel apron is further joined to said joint portion.

9. The suspension mounting structure according to claim 2, which further comprises:
a reinforcement member fixed to a curved outer surface of a wheel apron to extend sideways from a front side frame along the curved outer surface of said wheel apron, and wherein
said mounting means comprises a mounting bracket, mounted to extend over said reinforcement member and said dash panel lower portion, for axially and pivotally supporting the rear end of said upper link member.

10. The suspension mounting structure according to claim 9, wherein
said reinforcement member is joined at one end to a wheel apron reinforcement member.

11. The suspension mounting structure according to claim 10, wherein
said reinforcement member is joined at the other end to a front side frame.

12. The suspension mounting structure according to claim 2, which comprises:
a reinforcement member fixed to a bent portion of said dash panel lower portion, and wherein
said mounting means comprises a mounting bracket, mounted on said dash panel lower portion via said reinforcement member, for axially and pivotally supporting the rear end of said upper link member, 13. The suspension mounting structure according to claim 12, wherein
said reinforcement member is fixed to a joint portion of a flat portion and a curved portion of said dash panel lower portion, which are joined to each other while being bent.

14. The suspension mounting structure according to claim 13, wherein
said flat portion and said curved portion of said dash panel lower portion are joined to each other via an inclined surface, and
said reinforcement member comprises a frame which is formed to have an L-shaped section so that a triangular closed section having said inclined surface as an oblique side is formed.

15. The suspension mounting structure according to claim 14, wherein
said mounting bracket is mounted on one surface of said reinforcement member.

* * * * *